US010697469B2

(12) United States Patent
Bigi et al.

(10) Patent No.: US 10,697,469 B2
(45) Date of Patent: Jun. 30, 2020

(54) CASING FOR A TURBOMACHINE

(71) Applicant: Nuovo Pignone Tecnologie Srl, Florence (IT)

(72) Inventors: Manuele Bigi, Florence (IT); Simone Marchetti, Florence (IT); Luciano Mei, Florence (IT); Odd Marius Rosvold, Sandvika (NO); Marco M A Anselmi, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 127 days.

(21) Appl. No.: 15/736,209

(22) PCT Filed: Jun. 15, 2016

(86) PCT No.: PCT/EP2016/063774
§ 371 (c)(1),
(2) Date: Dec. 13, 2017

(87) PCT Pub. No.: WO2016/202870
PCT Pub. Date: Dec. 22, 2016

(65) Prior Publication Data
US 2018/0187696 A1    Jul. 5, 2018

(30) Foreign Application Priority Data
Jun. 18, 2015   (IT) .................. 102015000025030

(51) Int. Cl.
*F04D 29/42*   (2006.01)
*F04D 13/08*   (2006.01)
(Continued)

(52) U.S. Cl.
CPC ......... *F04D 29/4286* (2013.01); *F04D 13/08* (2013.01); *F04D 25/0686* (2013.01);
(Continued)

(58) Field of Classification Search
CPC .. F04D 29/4286; F04D 13/08; F04D 25/0686; F04D 29/02; F04D 29/026; F04D 29/40; F04D 29/4206; B29C 70/30
(Continued)

(56) References Cited

U.S. PATENT DOCUMENTS 3,718,720 A * 2/1973 Lambdin, Jr. ........... C04B 35/83
                                                    264/29.1
4,137,006 A * 1/1979 Becker .................... F04D 29/40
                                                    29/463
(Continued)

FOREIGN PATENT DOCUMENTS

| CN | 201636064 U | 11/2010 |
|---|---|---|
| WO | 86/00047 A1 | 1/1986 |
| WO | 2013/153020 A2 | 10/2013 |

OTHER PUBLICATIONS

Italian Search Report and Written Opinion issued in connection with corresponding IT Application No. 102015000025030 dated Feb. 10, 2016.
(Continued)

*Primary Examiner* — Kenneth J Hansen
*Assistant Examiner* — Justin A Pruitt
(74) *Attorney, Agent, or Firm* — Baker Hughes Patent Organization

(57) ABSTRACT

A casing for a subsea compressor comprises a main body having a central axis; a plurality of interconnection flanges attached to the main body; wherein the main body comprises an inner layer made of corrosion resistant material; an outer layer applied over the inner layer and made of a composite material; wherein the outer layer extends along the entire length of said main body.

18 Claims, 3 Drawing Sheets

(51) Int. Cl.
*F04D 25/06* (2006.01)
*B29K 307/04* (2006.01)
*B29L 31/00* (2006.01)
*F04D 29/02* (2006.01)
*F04D 29/40* (2006.01)
*B29C 70/30* (2006.01)
*B29K 71/00* (2006.01)

(52) U.S. Cl.
CPC ........... *F04D 29/02* (2013.01); *F04D 29/026* (2013.01); *F04D 29/40* (2013.01); *F04D 29/4206* (2013.01); *B29C 70/30* (2013.01); *B29K 2071/00* (2013.01); *B29K 2307/04* (2013.01); *B29L 2031/7496* (2013.01); *F04D 29/4293* (2013.01)

(58) Field of Classification Search
USPC ....................................................... 415/213.1
See application file for complete search history.

(56) References Cited

U.S. PATENT DOCUMENTS

| | | | |
|---|---|---|---|
| 4,560,607 A * | 12/1985 | Sumner | B29C 37/0082 428/141 |
| 5,285,699 A * | 2/1994 | Walls | B29D 99/0046 74/572.12 |
| 5,415,079 A * | 5/1995 | Ching | B29C 63/10 92/169.2 |
| 6,206,631 B1 * | 3/2001 | Schilling | F01D 21/045 415/173.4 |
| 9,057,274 B2 * | 6/2015 | Bock | F01D 9/042 |
| 9,169,045 B2 * | 10/2015 | Clark | B65D 43/0222 |
| 9,835,170 B2 * | 12/2017 | Kabasawa | F04D 19/044 |
| 9,909,447 B2 * | 3/2018 | Elisseeff | B29C 70/30 |
| 2011/0281061 A1 * | 11/2011 | Nakamura | B29C 70/32 428/105 |
| 2013/0129494 A1 | 5/2013 | Duchaine et al. | |
| 2014/0271162 A1 * | 9/2014 | Karl | F04D 29/4286 415/200 |
| 2015/0322962 A1 * | 11/2015 | Paoletti | C23C 18/1698 166/75.11 |

OTHER PUBLICATIONS

International Search Report and Written Opinion issued in connection with corresponding PCT Application No. PCT/EP2016/063774 dated Aug. 29, 2016.

International Preliminary Report on Patentability issued in connection with corresponding PCT Application No. PCT/EP2016/063774 dated Dec. 28, 2017.

* cited by examiner

CASING FOR A TURBOMACHINE

FIELD OF INVENTION

The subject matter of the present disclosure relates to a casing for a turbomachine. Specifically, such turbomachine can be a compressor or motorcompressor for either subsea or offshore applications. Those turbomachines are commonly employed in the oil & gas industry sector. In the following disclosure a subsea motorcompressor will be described purely as an example of such application, however no loss of generality is intended.

BACKGROUND OF THE INVENTION

In the current state of the art, a casing for a subsea motorcompressor comprises a substantially cylindrical main body having a central axis. A plurality of interconnection flanges are attached to the main body. Such flanges allow for the attachment of external equipment to the motorcompressor, as well as the insertion end extraction of fluid processed by the motorcompressor itself or for other connections.

Currently, the casing is completely made of metal.

BRIEF DESCRIPTION OF THE INVENTION

The main drawback of the motorcompressor casing according to the state of the art is its heavy weight. In turn, this provides limited handling capability, as there is the need of a high load vessel (250 ton) to handle either the compressor submodule or the compressor module in case of scheduled or unscheduled servicing. For offshore applications, this causes lower reliability due to longer intervention time. Also, heavy motorcompressor casings usually translate to higher handling costs.

An embodiment of the invention therefore relates to a casing for a subsea motorcompressor. Such casing comprises a main body having a central axis. A plurality of interconnection flanges are attached to the main body.

The main body comprises an inner layer made of corrosion and/or erosion resistant material. The main body also comprises an outer layer applied over the inner layer and made of a composite material. The outer layer extends along the entire length of the main body or a portion of it.

According to an embodiment of the invention, the corrosion resistant material is a homogeneous material, which is intrinsically resistant to corrosion and/or erosion. According to a further embodiment of the invention, the corrosion resistant material, namely the inner layer, is defined by a layer of base metallic material and by a corrosion resistant layer or a coating.

This construction mode the weight of the casing is reduced. Therefore, the operations involved in handling and servicing the motorcompressor can be highly simplified, thus lowering the total downtime of the machine and the associated cost.

An embodiment of in an embodiment a method for manufacturing a casing of a motocompressor comprising a main body having a central axis and a plurality of interconnection flanges attached to the main body, the main body being realized by the steps of: providing an inner layer made of corrosion and/or erosion resistant material; applying over the inner layer an outer layer made of a composite material.

BRIEF DESCRIPTION OF THE DRAWINGS

Further details and specific embodiments will refer to the attached drawings, in which.

DETAILED DESCRIPTION OF THE INVENTION

Figure 1:
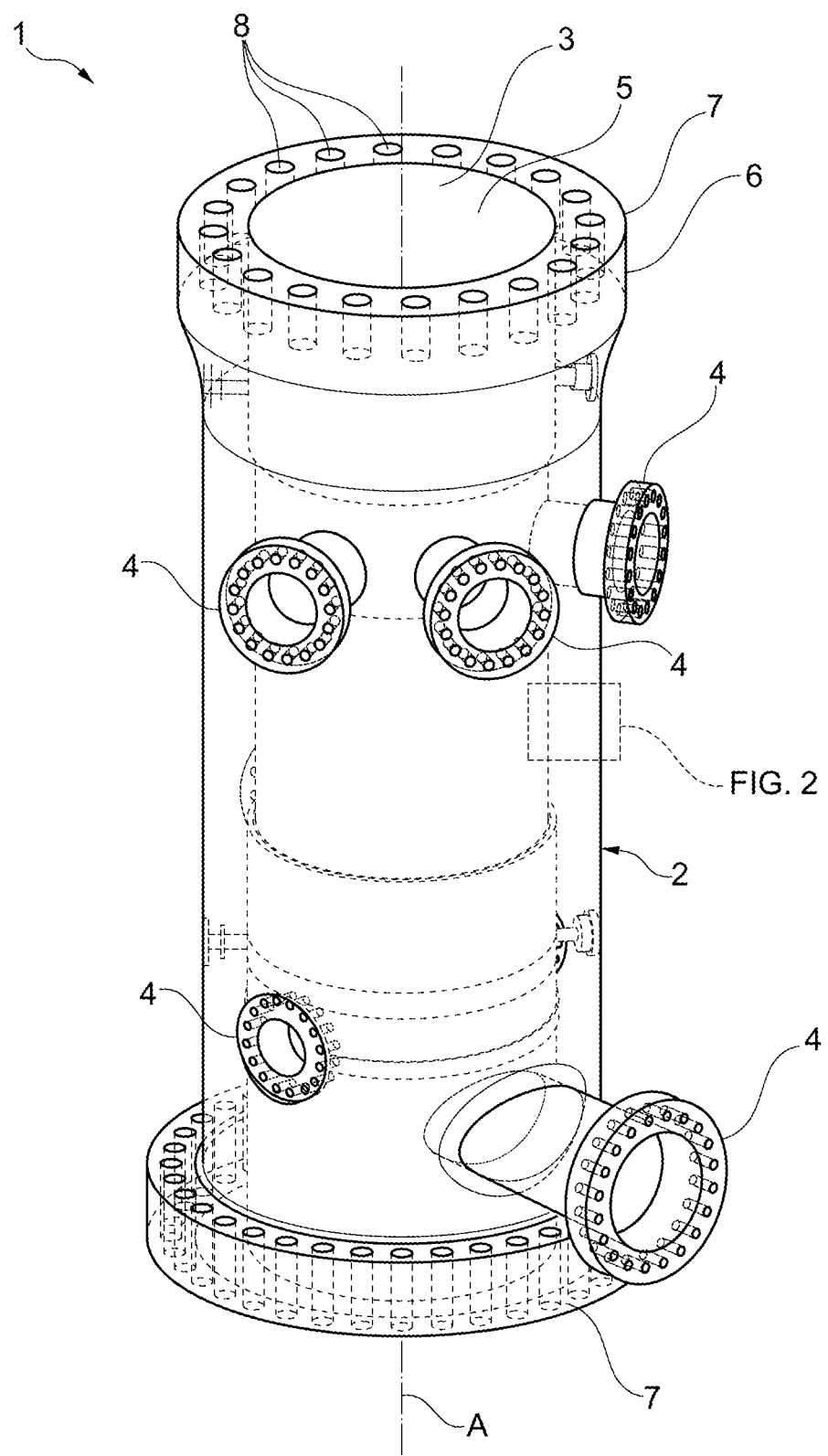
FIG. 1 is a perspective view of a casing for a subsea motorcompressor.

The following description of exemplary embodiments refer to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

With reference to the attached drawings, with the number 1 is indicated a casing for a subsea motorcompressor according to an embodiment of the present invention.

The casing 1 comprises a main body 2. The main body has a central axis "A". Indeed, the main body 2 is substantially axially symmetrical with respect of the central axis "A". In an embodiment, the main body 2 has a substantially hollow cylindrical shape. Indeed, the main body 2 has a central cavity 3 which has the function of housing the compressor and/or its motor (not shown in the drawings).

A plurality of interconnection flanges 4 are attached to the main body 2. Indeed, these flanges are provided so that the motorcompressor can be attached to external services. For example, two of the interconnection flanges 4 are for the process fluid, three are for the motor (not shown in the drawings), two for the bearings (also not shown). Other kind of flanges 4 can be one or more of the following: process flange, AMB connection flange, high voltage penetrators flange, instrumentation flange, cooling/purging/draining flange.

Please note that a different configuration of the motorcompressor can result in a different arrangement of the interconnection flanges 4 on the main body 2.

Figure 2A:
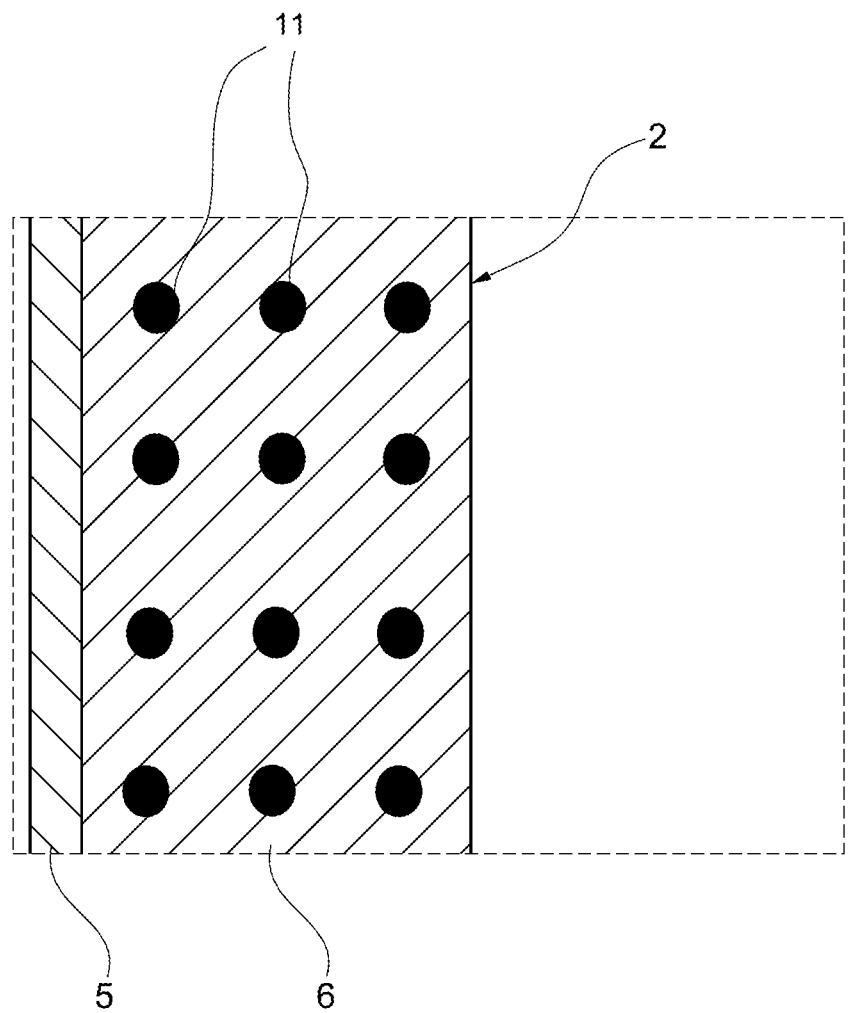
FIG. 2A is a schematic sectional view of a detail of the casing from FIG. 1.
Figure 2B:
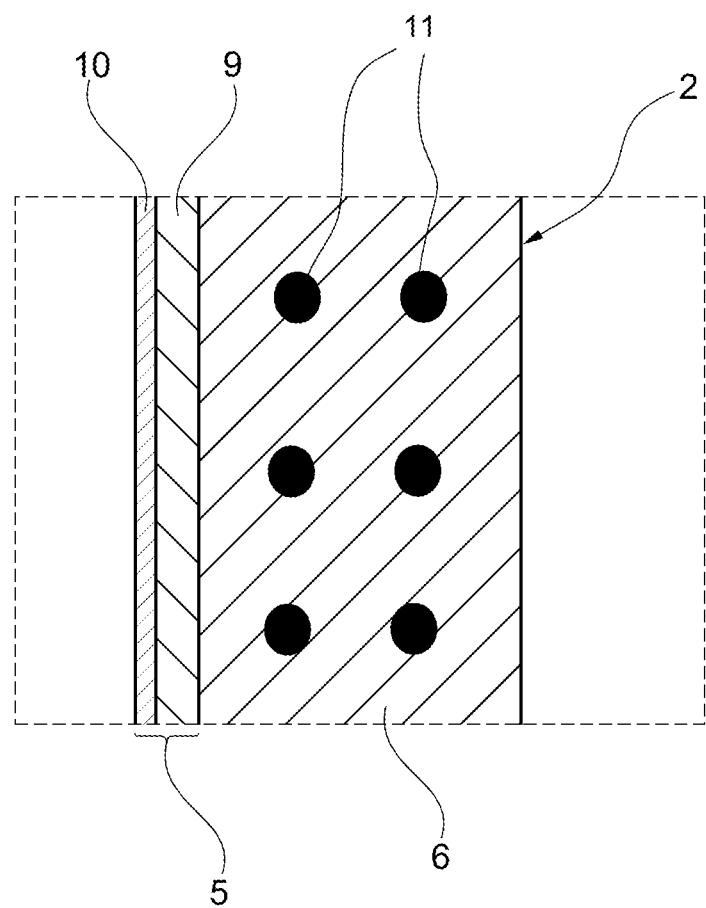
FIG. 2B is a schematic sectional view of a detail of the casing from FIG. 1.

In detail, as shown for example in FIGS. 2A and 2B, the main body 2 is defined by a dual-layer structure, comprising an inner layer 5 and an outer layer 6. In other words, the inner layer 5 defines the central cavity 3, therefore performs the function of "liner" for the motorcompressor. Indeed, according to the embodiment of the invention, the inner layer 5 does not perform any appreciable structural function. In a further embodiment, the inner layer 5 handles also a portion of the structural loads according to its thickness and to its mechanical characteristics.

With additional detail, the inner layer 5 is made of corrosion resistant material. Such material can be a nickel base alloy, for example, Inconel 625, or any other alloy having resistance characteristic suited to the fluid processed. With more detail, the inner layer 5 has a thickness comprised between 5 mm and 150 mm. Furthermore, by employing a production technique such as powder metallurgy, the minimum thickness can be further reduce below 5 mm, at least in some locations. In an embodiment, the thickness of the inner layer is equal to 15 mm. According to the embodiments of the invention, the thickness of the inner layer 5 is substantially constant.

According to a further embodiment of the invention, the corrosion resistant material, namely the inner layer 5, is defined by a base layer 9 of metallic material and by a corrosion resistant layer 10, which can be applied onto the base metallic material by welding overlay or any other suitable method. According to the present disclosure, the corrosion resistant layer 10 can also be a coating, which can be applied by plasma spray, HVOF, arc spray, flame spray, metalizing, etc.

The outer layer 6 is applied over the inner layer 5, and is made of a lightweight material able to withstand the structural loads acting on the casing 1. In an embodiment, the outer layer 6 is made of a composite material. Also, the outer layer 6 has a thickness comprised between 20 mm and 100 mm. In an embodiment, the thickness of the outer layer 6 is equal to 35 mm. The composite material employed for the outer layer 6 can be, for example, PEEK reinforced with continuous carbon fibers 11.

As shown in the figures, the outer layer 6 extends substantially along the entire length of the main body 2. Specifically, according to the present disclosure the length of the main body 2 is measured in a direction parallel to its central axis "A". Moreover, the outer layer 6 extends along a plurality of the interconnection flanges 4. Similarly, the inner layer 5 extends along a plurality of the interconnection flanges 4.

In an embodiment, both the outer layer 6 and the inner layer 5 extend along all of the interconnection flanges 4.

According to an embodiment of the invention the material of the outer layer 6 is configured to be substantially isotropic at least on the main body 2. According to an embodiment of the invention, the composite material of the outer layer 6 is anisotropic, in an embodiment orthotropic, at least on the main body 2. Indeed, in this case the main body 2 will comprise multiple plies, each with its fibers 11 oriented in the direction of the local stress.

The main body 2 also comprises two flanged ends 7, opposite to each other. As shown in FIGS. 2A and 2B, the inner 5 and the outer layer 6 also define the flanged ends 7. Such flanged ends allow to join the casing 1 to other equipment, as it is usual in the technical field. It is to be noted that each flanged end 7 is provided with a plurality of connection holes 8. In an embodiment, these connection holes 8 are parallel to the central axis "A" of the main body 2, and are drilled on in the outer layer 6.

According to a further embodiment of the invention, the casing 1 is suitable for a compressor (not shown) which is connected to a separate motor (also not shown). In this case, the main body 2 has an opening (not shown) configured to receive a shaft to connect the compressor, placed inside the main body 2, to a motor which is placed outside the main body 2. In an embodiment, the opening is circular and centered on the central axis "A" of the main body 2.

According to an embodiment of the present invention the casing 1 of a motocompressor is manufactured by providing an inner layer 5 made of corrosion and/or erosion resistant material and applying over the inner layer 5 an outer layer 6 made of a composite material so create the main body 2 of the casing 1.

The main body 2 of the casing 1 has a central axis A and a plurality of interconnection flanges 4 attached to the main body 2.

The outer layer 6 can be realized by winding the fibers 11 of the composite material about the outer surface of inner layer 5.

The fibers 11 are also impregnated in a resin, in an embodiment an epoxy resin or a PEEK resin.

The fibers 11 are arranged so that if inner layer 5 expands, for example due to an inflating pressure applied inside the casing 1, the fibers 11 work under traction.

In this way, the fibers 11 are arranged over the inner layer 5 so to maximize the mechanical properties of the composite material.

The fibers 11 can be arranged in several plies. The fibers 11 of each ply can be arranged so to optimized the stress and deformation of the inner layer 5 along a specific direction. For example they can be arranged in circle for optimizing the radial deformation of the inner layer 5.

The outer layer 6 extends along the entire length of said main body 2.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A casing for a turbomachine, the casing comprising:
   a main body having a central axis, the main body comprising an inner layer made of corrosion resistant material and an outer layer made of a composite material applied over the inner layer, wherein the outer layer extends along the entire length of the main body and is reinforced with continuous carbon fibers within the outer layer, and the inner layer has a thickness between 5 mm and 150 mm; and
   a plurality of interconnection flanges attached to the main body.

2. The casing according to claim 1, wherein the inner layer extends along the plurality of interconnection flanges.

3. The casing according to claim 1, wherein the outer layer extends along the plurality of interconnection flanges.

4. The casing according to claim 1, wherein the main body further comprises two flanged ends opposite to each other.

5. The casing according to claim 1, wherein each flanged end is provided with a plurality of connection holes.

6. The casing according to claim 5, wherein the connection holes are made into the outer layer.

7. The casing according to claim 1, wherein the outer layer material is substantially isotropic at least on the main body.

8. The casing according to claim 1, wherein the outer layer material is anisotropic, at least on the main body.

9. The casing according to claim 1, wherein the inner layer is defined by a base layer of metallic material and by a corrosion resistant layer applied onto the base layer.

10. The casing according to claim 1, wherein the main body has an opening configured to receive a shaft to connect a compressor inside the main body to a motor outside the main body.

11. The casing according to claim 1, wherein the inner layer can contact a fluid processed by the turbomachine, and the outer layer never contacts the processed fluid.

12. A subsea compressor comprising a casing according to claim 1.

13. The casing according to claim 1, wherein the inner layer has a thickness equal to 15 mm.

14. The casing according to claim 1, wherein the outer layer material is orthotropic at least on the main body.

15. The casing according to claim 1, wherein the outer layer has a thickness between 20 mm and 100 mm.

16. A casing for a turbomachine, the casing comprising:
  a main body having a central axis, the main body comprising an inner layer made of corrosion resistant material and an outer layer made of a composite material applied over the inner layer, wherein the outer layer extends along the entire length of the main body and is reinforced with continuous carbon fibers within the outer layer, and the outer layer has a thickness between 20 mm and 100 mm; and
  a plurality of interconnection flanges attached to the main body.

17. The casing according to claim 16, wherein the outer layer has a thickness equal to 35 mm.

18. A subsea compressor comprising a casing according to claim 16.

* * * * *